No. 755,287. PATENTED MAR. 22, 1904.
S. S. EVELAND.
ANTIFRICTION END THRUST DEVICE.
APPLICATION FILED AUG. 22, 1902.
NO MODEL. 2 SHEETS—SHEET 1.

Witnesses

Inventor
Samuel S. Eveland
By
Augustus B. Stoughton
Attorney

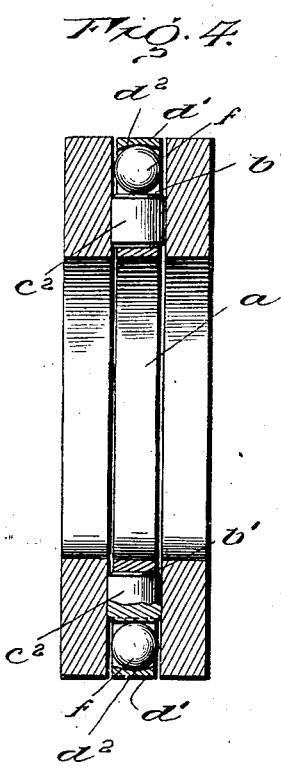
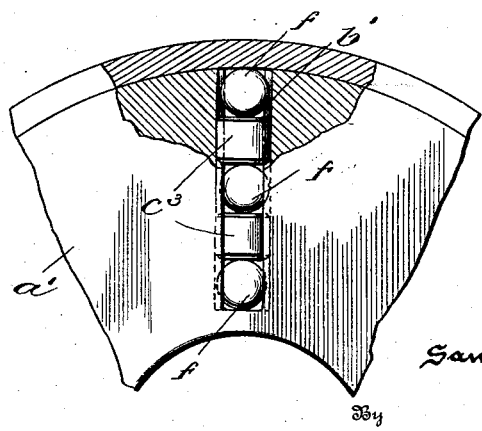

No. 755,287. Patented March 22, 1904.

UNITED STATES PATENT OFFICE.

SAMUEL S. EVELAND, OF PHILADELPHIA, PENNSYLVANIA.

ANTIFRICTION END-THRUST DEVICE.

SPECIFICATION forming part of Letters Patent No. 755,287, dated March 22, 1904.

Application filed August 22, 1902. Serial No. 120,687. (No model.)

*To all whom it may concern:*

Be it known that I, SAMUEL S. EVELAND, a citizen of the United States, residing at Philadelphia, in the county of Philadelphia and State of Pennsylvania, have invented a certain new and useful Antifriction End-Thrust Device, of which the following is a specification.

The primary object of the invention is to provide a device such as stated which will efficiently resist heavy pressures transferred to it without distorting, grinding, or crushing the antifriction bearings or devices.

The nature, characteristic features, and scope of the invention will be more clearly understood from the following description, taken in connection with the accompanying drawings, forming a part hereof, and in which—

Figure 1:
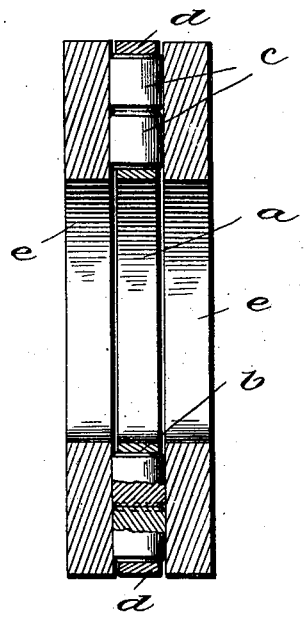
Figure 2:
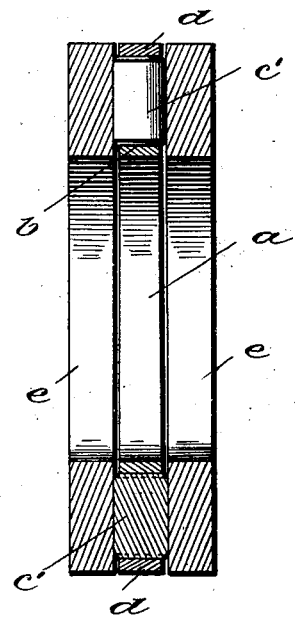
Figure 3:
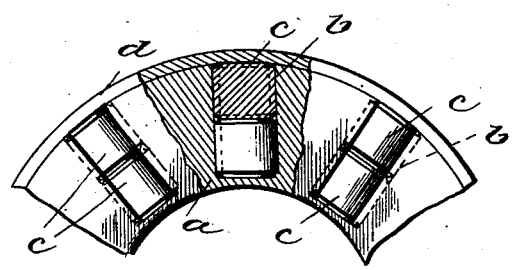

Figure 1 is a vertical sectional view of a cage or collar and its complemental disks or washers, said cage having radial sockets provided with duplicate rollers in accordance with my invention. Fig. 2 is a similar view of a thrust collar or cage provided with single rollers. Fig. 3 is a fragmentary sectional elevational view of the cage shown in Fig. 1, illustrating the arrangement of the sockets. Fig. 4 is a vertical sectional view of a thrust-cage, each socket of which is provided with a ball and roller; and Fig. 5 is a fragmentary sectional elevational view of a thrust-collar, illustrating one of its sockets, each of which is equipped with a plural number of rollers and with intervening balls.

Having reference to the drawings, $a$, Figs. 1, 2, and 3, represents a disk or collar which is formed or provided with an intact inner wall and has its outer edge or periphery formed or provided with a series of main sockets $b$ extending radially inward. These sockets $b$ are open at their sides and, as indicated by dotted lines in Fig. 3, have their walls concaved or channeled.

$c$ represents rollers, which have true cylindrical faces and flat ends. The sockets $b$, Figs. 1 and 3, are equipped with two such rollers placed end to end, with the cylindrical faces protruding through the open sides of the slots, while in Fig. 2 one roller $c'$ of relatively increased length is illustrated as occupying each main socket $b$.

$d$ is an annulus or ring which operates to confine the rollers in their sockets.

$e$ represents concentric disks or collars with hardened inner faces, against which the cylindrical portions of the rollers abut.

The described construction, while answering satisfactorily the requirements of an antifriction-bearing, is mainly adapted and intended for use in contingencies where heavy pressures have to be resisted.

In Figs. 4 and 5 I have illustrated an antifrictional device that is capable of resisting radial pressures, as well as heavy longitudinal or end thrusts. $a'$, Fig. 4, represents the thrust cage or collar served with sockets $b'$, which are similar to sockets $b$, and each of which is equipped with a cylindrical roller $c^2$ and with a ball $f$, the latter being located between the outer flat end of the roller and the annulus or band $d'$, which may have a race $d^2$ to accommodate the balls. In Fig. 5 the sockets $b'$ are each provided with a series of two or more cylindrical rollers $c^3$ with flat ends, as in the other constructions, and with the balls $f$, interposed between and arranged endwise of the rollers.

It is evident that in the latter two constructions the cylindrical rollers will resist end or longitudinal thrust, while the balls will serve to transfer radial thrust or pressure.

It will be obvious to those skilled in the art to which the invention appertains that modifications may be made in details without departing from the spirit and scope of the same. Hence I do not limit myself to the precise construction and arrangement of parts hereinabove described, and illustrated in the accompanying drawings; but, Having described the nature and objects of the invention, what I claim as new, and desire to secure by Letters Patent, is—

1. A thrust-bearing comprising collars having hardened inner faces, an intermediate collar having an intact inner wall and having a series of main sockets extending from the outer edge or periphery of the collar inwardly and which are open at their sides and have concave walls, cylindrical rollers with flat ends arranged in said sockets so that their cylindrical faces protrude through the side openings of the sockets and have rolling contact with the hardened inner faces of the adjoining collars, and an annulus or band mounted on the periphery of said intermediate collar and acting to retain the rollers, substantially as described.

2. A thrust-bearing comprising collars having hardened inner faces, an intermediate collar having an intact inner wall and having a series of main sockets extending from the outer edge or periphery of the collar inwardly and which are open at their sides and have concave walls, a plural number of rollers with flat ends and cylindrical faces arranged in each of said sockets with their cylindrical faces protruding through the side openings of the sockets and impinging against the hardened inner faces of the adjoining collars, balls separating said rollers and arranged endwise thereof, and an encircling band or annulus for confining the balls and rollers, substantially as described.

In testimony whereof I have hereunto signed my name in the presence of two subscribing witnesses.

SAML. S. EVELAND.

Witnesses:
W. J. JACKSON,
FRANK E. FRENCH.